(12) United States Patent
Fortunato et al.

(10) Patent No.: US 9,782,931 B2
(45) Date of Patent: Oct. 10, 2017

(54) STEREOLITHOGRAPHY METHOD FOR PRODUCING A THREE-DIMENSIONAL OBJECT, COMPRISING A MOVEMENT ACCORDING TO WHICH A SUPPORTING SURFACE FOR SAID OBJECT INTERMITTENTLY APPROACHES THE BOTTOM OF A CONTAINER, AND STEREOLITHOGRAPHY MACHINE USING SAID METHOD

(71) Applicant: DWS S.R.L., Thiene (IT)

(72) Inventors: Roberto Fortunato, Torrebelvicino (IT); Sergio Zenere, Carre' (IT)

(73) Assignee: DW S.R.L., Thiene (VI) (IT)

( * ) Notice: Subject to any disclaimer, the term of this patent is extended or adjusted under 35 U.S.C. 154(b) by 397 days.

(21) Appl. No.: 14/380,320

(22) PCT Filed: Jul. 15, 2013

(86) PCT No.: PCT/IB2013/001540
§ 371 (c)(1),
(2) Date: Aug. 21, 2014

(87) PCT Pub. No.: WO2014/013312
PCT Pub. Date: Jan. 23, 2014

(65) Prior Publication Data
US 2015/0123319 A1    May 7, 2015

(30) Foreign Application Priority Data

Jul. 16, 2012 (IT) .............................. VI2012A0172

(51) Int. Cl.
*B29C 35/08* (2006.01)
*B29C 67/00* (2017.01)
(Continued)

(52) U.S. Cl.
CPC ...... *B29C 67/0062* (2013.01); *B29C 67/0066* (2013.01); *B29C 67/0088* (2013.01); *B33Y 10/00* (2014.12); *B33Y 50/02* (2014.12)

(58) Field of Classification Search
CPC .............. B29C 67/0062; B29C 67/007; B29C 67/0066; B29C 67/0088
See application file for complete search history.

(56) References Cited

U.S. PATENT DOCUMENTS

| 2008/0174050 A1 | 7/2008 | Kikuchi | |
| 2009/0020901 A1* | 1/2009 | Schillen | B29C 67/0051 264/31 |
| 2010/0283188 A1* | 11/2010 | Rohner | A61C 13/0013 264/401 |

FOREIGN PATENT DOCUMENTS

| EP | 1 876 012 A1 | 1/2008 |
| EP | 1876012 A1 * | 1/2008 |
| JP | 2001-315214 | 11/2001 |

OTHER PUBLICATIONS

Office action from corresponding JP patent application 2013-547930, dated Sep. 30, 2014.
(Continued)

*Primary Examiner* — Galen Hauth
(74) *Attorney, Agent, or Firm* — Husch Blackwell LLP

(57) ABSTRACT

The invention is a method for producing a three-dimensional object in layers through stereolithography, comprising the following operations: moving a supporting surface (6a, 7a) near the bottom (2a) of a container (2) containing a liquid substance (3), so as to arrange it in a predefined operating position (17); selectively irradiating a layer (6) of liquid substance (3) with pre-defined radiation (4), in such a way as to solidify it against the supporting surface (6a, 7a). The approaching movement (11) comprises a plurality of approaching moves (12, 12a, 12b, 12c) having correspond-
(Continued)

ing predefined lengths (13, 13a, 13b, 13c), spaced by corresponding intermediate stops (14, 14a, 14b) for corresponding predefined time intervals (15, 15a, 15b), the intermediate stops (14, 14a, 14b) being carried out when the supporting surface (6a, 7a) is at least partially immersed in the liquid substance (3).

10 Claims, 2 Drawing Sheets

(51) Int. Cl.
    *B33Y 10/00*     (2015.01)
    *B33Y 50/02*     (2015.01)

(56) References Cited

OTHER PUBLICATIONS

English-language translation of office action from corresponding JP patent application 2013-547930, dated Sep. 30, 2014.
English-language translation of JP patent application publication 2001-315214, dated Nov. 13, 2001.
PCT International Search Report, dated Dec. 5, 2013, corresponding to International Application No. PCT/IB2013/001540.
PCT Written Opinion of the International Searching Authority, dated Dec. 5, 2013, corresponding to International Application No. PCT/IB2013/001540.

\* cited by examiner

STEREOLITHOGRAPHY METHOD FOR PRODUCING A THREE-DIMENSIONAL OBJECT, COMPRISING A MOVEMENT ACCORDING TO WHICH A SUPPORTING SURFACE FOR SAID OBJECT INTERMITTENTLY APPROACHES THE BOTTOM OF A CONTAINER, AND STEREOLITHOGRAPHY MACHINE USING SAID METHOD

DESCRIPTION

The present invention concerns a stereolithography method for the production of a three-dimensional object, as well as a stereolithography machine using said method.

As is known, a stereolithography machine comprises a container for a liquid substance suited to be solidified through exposure to predefined radiation, typically light radiation.

The above mentioned radiation is produced by radiation emitting means that selectively irradiate a layer of the liquid substance having a predefined thickness and arranged so that it is adjacent to the bottom of the container, in such a way as to solidify it.

The machine also comprises a modeling plate facing the bottom of the container and provided with a supporting surface for the three-dimensional object to be obtained.

The above mentioned modeling plate is associated with moving means that are suited to move it according to a direction perpendicular to the bottom of the container.

Using a machine of the above mentioned type, the object is manufactured by superimposing a succession of layers having a predefined thickness.

More precisely, according to the production method, the modeling plate is first arranged with the supporting surface immersed in the liquid substance, at a distance from the bottom of the container that is equal to the thickness of the first layer of the object.

A layer of liquid substance is thus defined that is adjacent to the bottom of the container and that is selectively irradiated by the radiation emitting means in the portions corresponding to the surface area of the first layer of the object, so as to form a corresponding solidified layer that adheres to the surface supporting the modeling plate.

Successively, the modeling plate is first moved away from the bottom of the container, in such a way as to separate the solidified layer from the bottom itself.

In this way, the liquid substance is allowed to flow under the modeling plate and the liquid layer necessary for the formation of a successive layer of the object is consequently restored.

Successively, the modeling plate is once again moved near the bottom of the container, in such a way as to arrange the previously solidified layer at a distance from the bottom that is equal to the thickness of the successive layer to be obtained.

The solidification of the new layer of the object is carried out analogously to the solidification of the previous layer and in contact with the surface of the latter, which serves as a supporting surface for the new layer.

The process described above is repeated until all the layers that make up the object have solidified.

The method described above poses the drawback that the movement with which the modeling plate and the already solidified portion of the object approach the bottom of the container meets a certain resistance, due to the viscosity of the liquid substance that has to be displaced during this movement.

This resistance exerts a compression force on the three-dimensional object being formed and a thrust force on the bottom of the container, the entity of these forces mainly depending on the plate movement speed, on the surface area of the plate and of the already solidified object and on the physical properties of the liquid substance.

Beyond a given threshold, said compression force may cause the breakage of the three-dimensional object being formed, with the consequent need to repeat the procedure starting again from the beginning.

In order to avoid such a situation, it is necessary to limit the speed at which the modeling plate approaches the bottom of the container.

Obviously, said speed limitation makes it impossible to reduce the time necessary for the approach of the plate for each layer by more than a given value, which negatively affects the object's overall production time.

Furthermore, even if the compression force is limited to a value below the breakage threshold, said compression force, however, subjects the object being formed to a certain elastic deformation, due to the relatively small cross sections that are generally typical of the objects produced using the stereolithography method.

It can be understood that the compression force and, consequently, the elastic deformation do not disappear as soon as the plate stops, but need a certain amount of time before disappearing, this amount of time being necessary for the complete outflow of the liquid substance and the consequent elastic recovery of the object.

It is evident that the solidification of the successive layer cannot take place until said elastic deformation has reduced to a residual value that is such as not to induce any distortion in the three-dimensional object being formed.

If, as it often happens, the liquid substance is very viscous, said outflow requires a relatively long time, which increases the duration of the object's production process.

A further drawback posed by the machine described above lies in that the larger the modeling plate, the higher the compression force exerted on the liquid substance and, therefore, the risk of splashing the substance itself outside the container during the immersion of the plate.

Therefore, the speed of the approaching movement must decrease proportionally to the increase in the plate size, which further extends the duration of the production process.

A further drawback lies in that the thrust forces mentioned above generate fatigue stress on the bottom of the container, which causes the container to deteriorate and, over time, to break down.

This, therefore, involves the need to periodically replace the container, with the inconvenience of having to stop production and bear the replacement costs.

In a known variant embodiment of the above mentioned machine, a glass wall is provided to support the container.

The glass wall limits the deformation of the container and furthermore prevents any untimely breakage of the latter from causing the liquid substance contained in the machine to flow out, damaging the radiation emitting means that are generally arranged under the container.

It is evident that in this variant the compression stress and any damage described above are in any case transmitted to the glass wall that, like the container, can be subjected to progressive deterioration.

The present invention intends to overcome all the drawbacks of the known art outlined above.

In particular, it is a first object of the invention to provide a method for making a three-dimensional object in layers using a stereolithography machine, which makes it possible to limit both the compression stress to which the three-dimensional object being formed is subjected and the thrust forces exerted on the bottom of the container or on any supporting glass wall during the approach of the modeling plate to the bottom itself.

It is another object of the invention to develop the method mentioned above so that it can be easily applied to stereolithography machines of the known type.

The above mentioned objects are achieved by a method for producing a three-dimensional object implemented according to the main claim.

Further characteristics and details of the method that is the subject of the invention are described in the corresponding dependent claims.

Advantageously, reducing the stress makes it possible to reduce the time needed by the object being formed to approach the bottom of the container, thus reducing the processing time of each layer of the object and, consequently, the overall duration of the processing cycle.

Still advantageously, reducing the stress makes it possible to limit the elastic deformation of the object being formed, thus reducing its elastic recovery time.

Still advantageously, the reduced stress to which the layers of the object are subjected makes it possible to obtain objects with larger cross section than the objects obtainable with the known methods, while maintaining the same approach time and the same physical characteristics of the liquid substance used.

Still advantageously, the reduced stress exerted on the container or the supporting glass wall makes it possible to increase the duration of the latter, in such a way as to reduce the need for replacement.

Still advantageously, the reduced compression forces exerted by the modeling plate on the liquid substance during the immersion reduce the risk of splashing the substance itself.

The said objects and advantages, together with others which will be highlighted below, are illustrated in the description of two preferred embodiments of the invention which are provided by way of non-limiting examples with reference to the attached drawings, wherein.

Figure 1:
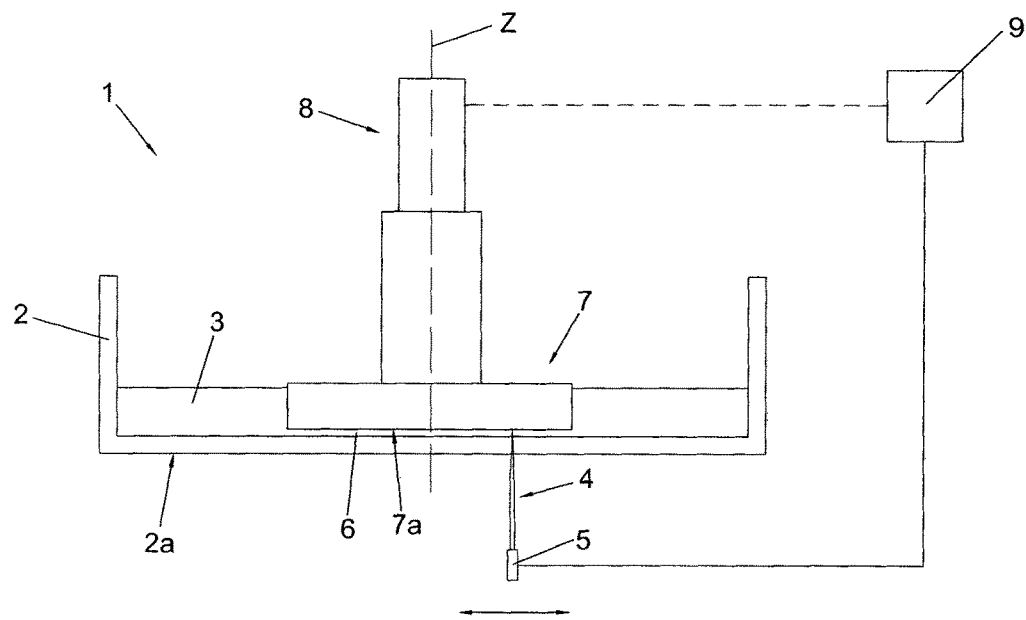
FIG. 1 shows a stereolithography machine according to the invention.

The method for producing a three-dimensional object that is the subject of the invention is described with reference to a stereolithography machine that is indicated as a whole by 1 in FIG. 1.

The above mentioned stereolithography machine 1 comprises a container 2 for containing a liquid substance 3 suited to be solidified through exposure to predefined radiation 4.

The machine 1 also comprises means 5 suited to emit said predefined radiation 4, capable of selectively irradiating a layer 6 of the liquid substance 3 having a predefined thickness and arranged adjacent to the bottom 2a of the container 2.

Figure 2:
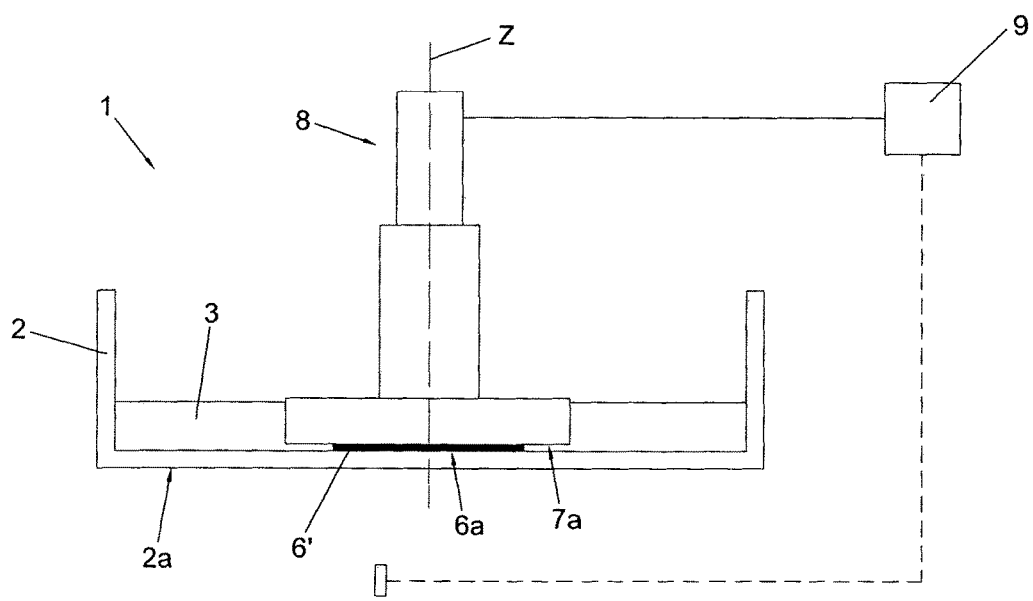
FIG. 2 shows the stereolithography machine shown in FIG. 1 in a different operating configuration.

The irradiation of the liquid layer 6 leads to the formation of a corresponding solidified layer 6' of the object, as schematically represented in FIG. 2.

Preferably but not necessarily, said predefined radiation 4 is a laser beam that, through the above mentioned emitting means 5, is selectively directed towards the areas corresponding to the volume of the object to be produced.

It is evident, on the other hand, that in variant embodiments of the invention not illustrated herein the emitting means can be of any other known type.

The machine 1 also comprises actuator means 8 suited to move the solidified layer 6' with respect to the bottom 2a of the container 2 according to a direction of movement Z perpendicular to the bottom 2a.

Preferably, said actuator means 8 comprise a modeling plate 7 provided with a surface 7a facing the bottom 2a of the container 2 to support said solidified layer 6'.

The stereolithography machine 1 also comprises a logic control unit 9, operatively connected to the emitting means 5 and to the actuator means 8, and configured so as to implement a method according to the invention, as described below.

Preferably, said logic control unit 9 is a programmable device and the configuration mentioned above is obtained by loading on said device an IT program that, once it has been executed, implements the method of the invention.

Figure 3:
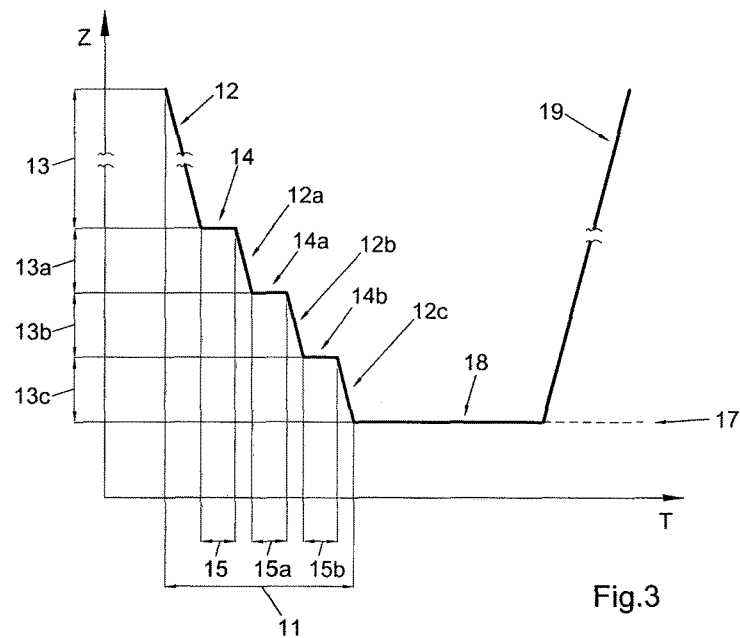
FIG. 3 shows a schematic view of the movement of a surface supporting a solidified layer of the object during application of the method that is the subject of the invention.

According to the method of the invention, the surface 7a of the modeling plate 7 is first of all moved near the bottom 2a of the container 2 through a first mutual positioning movement 11 having a predefined extension and shown in the diagram of FIG. 3, which represents the position of the surface 7a with respect to the direction of movement Z as a function of time T.

It can be understood that, as the surface 7a of the modeling plate 7 approaches the bottom 2a, the air space between the two elements, which allows the outflow of the liquid substance 3 towards the edges of the plate 7, becomes thinner, thus making the outflow more and more difficult.

Consequently, the reaction thrust of the liquid substance 3 on the surface 7a and on the bottom 2a, previously described, progressively increases during said approaching movement.

In the case where the bottom 2a rests on a supporting wall, for example made of glass, the thrust force exerted on the bottom 2a is obviously transmitted to said wall.

Once the surface 7a has reached a predefined operating position 17, shown in FIG. 1 and corresponding to a distance from the bottom 2a that is equal to the predefined thickness of the layer 6 of liquid substance 3, the latter is irradiated with the predefined radiation 4 in order to obtain the corresponding solidified layer 6'.

The surface 7a is maintained in said operating position 17 during the entire solidification stage, illustrated in FIG. 2 and indicated by 18 in FIG. 3.

Successively, the actuator means 8 separate the solidified layer 6' from the bottom 2a of the container 2 by means of a mutual receding movement 19.

For the formation of a successive layer of the object, said solidified layer 6' is once again moved near the bottom 2a of the container 2 through a second analogous positioning movement 11 that however is not necessarily identical to the one described above.

Obviously, the layer that is successively solidified will be supported by the surface 6a of the already solidified layer 6' facing the bottom 2a.

Clearly, during the second positioning movement 11, the bottom 2a of the container 2 is subjected to thrust forces that are analogous to those described with reference to the first positioning movement 11.

Said thrust forces act also on the solidified layer 6', subjecting it to stress as described above and causing its elastic deformation.

Obviously, said thrusting action is generated on each one of the successive layers of the three-dimensional object.

In particular, as the number of solidified layers, and thus the height of the object being formed, increases, the elastic deformation induced on the latter during the approach to the bottom 2a increases accordingly, due to the reaction of the liquid substance 3.

According to the method of the invention, one or more of the above mentioned positioning movements 11 comprises a plurality of approaching moves 12, 12a, 12b, 12c covering respective predefined lengths 13, 13a, 13b, 13c.

Said approaching moves 12, 12a, 12b, 12c are spaced by intermediate stops 14, 14a, 14b lasting for respective predefined time intervals 15, 15a, 15b, carried out when the surface 6a or 7a intended to support the successive solidified layer 6' is at least partially immersed in the liquid substance 3.

As previously explained, if the positioning movement 11 takes place first, that is, if it precedes the solidification of the first layer of the object, said supporting surface is the surface 7a of the plate 7, while if the positioning movement follows the solidification of the first layer of the object, said supporting surface is the surface 6a of the last solidified layer 6'.

Advantageously, each intermediate stop allows the liquid substance 3 to flow out at the sides of the supporting surface 6a or 7a, limiting the pressure exerted on it and on the bottom 2a of the container 2.

Therefore, said intermediate stops 14, 14a, 14b have the effect of limiting the compression stress on the object being formed and the thrust forces exerted on the bottom 2a of the container 2 to lower values compared to the values that would result if the positioning movement 11 were a continuous movement as in the case of the machines of known type, thus achieving one of the objects of the invention.

Advantageously, limiting the stress on the object being formed allows elastic deformation of the latter to be limited, too, thus reducing the time necessary for its successive elastic recovery.

Furthermore, advantageously, reducing the compression force exerted on the liquid substance 3 by the modeling plate 7 means reducing the risk of splashes outside the container 2.

Still advantageously, the stop intervals 15, 15a, 15b allow the inner stress to be redistributed in the three-dimensional object and in the bottom 2a of the container 2, which further limits the harmful effects of said stress.

Consequently, to advantage, the method of the invention makes it possible to reduce the number of production rejects compared to that obtained with the known methods.

Furthermore, to advantage, the reduced stress obtained with the method of the invention makes it possible to produce objects having larger cross section than those obtainable with the known stereolithography methods, the processing time and the type of liquid substance remaining the same.

Analogously, the method described above makes it possible to reduce the tensile stress on the bottom 2a of the container 2 and also on the supporting wall of the container 2, where provided, with the advantage of extending the useful life of these components.

It should be observed that all the above mentioned advantages are obtained thanks to the presence of the intermediate stops 14, 14a, 14b, and therefore there is no need to modify the speed of the actuator means 8.

Therefore, the method of the invention can be used in a stereolithography machine of the known type by means of a simple modification to the programming of the logic control unit 9, with no need to make mechanical modifications or to add complex systems for adjusting the speed of the actuator means 8, thus achieving the further object of making the method easy to apply to a machine of the known type.

The number of the approaching moves 12, 12a, 12b, 12c and of the intermediate stops 14, 14a, 14b, as well as the corresponding predefined lengths 13, 13a, 13b, 13c and the time intervals 15, 15a, 15b can be defined in any way.

Furthermore, the first one of said approaching moves 12 is preferably used to move the supporting surface 6a or 7a from an initial position in which it is out of the liquid substance 3 to a final position in which it is at least partially immersed in the liquid substance 3.

On the other hand, in variant embodiments of the invention said first approaching move 12 can start with the supporting surface 6a or 7a already immersed in the liquid substance 3.

Figure 4:
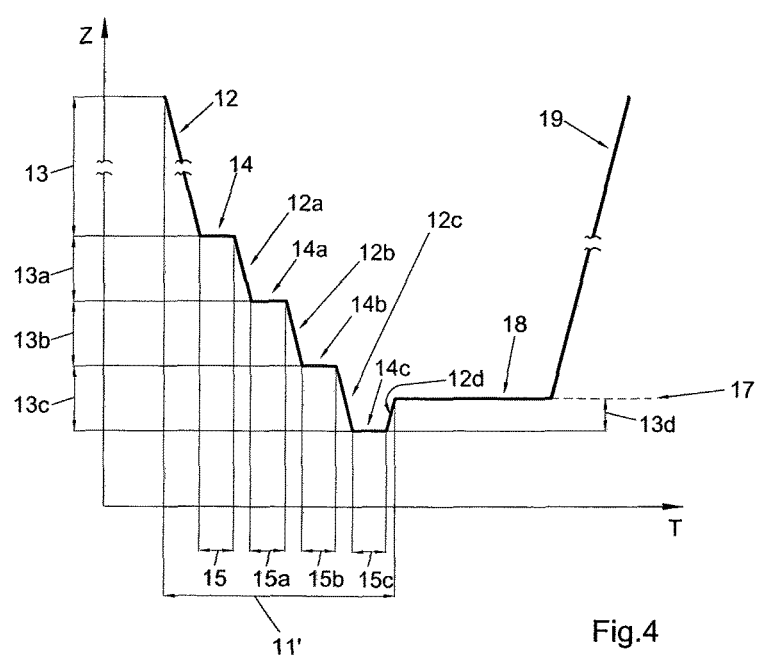
FIG. 4 shows a schematic view of the movement of a surface supporting a solidified layer of the object during application of a variant of the method that is the subject of the invention.

According to a variant embodiment of the invention, in the positioning movement 11', shown in the diagram of FIG. 4, the last approaching move 12c is such that the supporting surface 6a, 7a is brought beyond the operating position 17.

The positioning movement 11' ends with a receding move 12d that moves the supporting surface 6a, 7a away from the bottom 2a of the container 2, with length 13d.

Said receding move 12d is preferably spaced from the last approaching move 12c by an intermediate stop 14c with duration 15c.

Advantageously, the positioning movement 11' just described above makes it possible to reduce the elastic recovery time of the object being formed.

In fact, the last approaching move 12c positions the supporting surface 6a, 7a at a distance from the bottom 2a that is shorter than the thickness of the layer 6 of liquid substance 3 to be solidified, thus forcing a quicker outflow of the liquid substance 3 from the edges of the supporting surface 6a, 7a.

The successive receding move 12d, in addition to arranging the supporting surface 6a, 7a in the operating position 17, has also the effect of reducing the stress exerted on the object being formed and on the bottom 2a.

Preferably, the extent of the last approaching move 12c and of the receding move 12d, and the duration of the intermediate stop 14c are determined so that the residual elastic deformation of the object being formed after the receding move 12d makes it possible to irradiate the layer 6 as soon as the receding move 12d has been completed, without inducing distortions in the three-dimensional object being formed.

Preferably, independently of the positioning movement 11, 11' adopted, the values of one or more parameters selected among the lengths of the approaching moves 12, 12a, 12b, 12c and of the receding move 12d, the number of the intermediate stops 14, 14a, 14b, 14c and the corresponding time intervals 15, 15a, 15b, 15c are determined before starting the positioning movement.

In this way, said selected parameters are independent of any feedback of the actuator means 8, avoiding possible delays in the intermediate stops, to the advantage of the precision and reliability of the method.

Preferably but not necessarily, the values of said selected parameters are calculated as a function of the surface area of the supporting surface 6a or 7a.

Advantageously, said calculation makes it possible to optimize each positioning movement 11, 11', in such a way as to reduce to a minimum the extent of the positioning movement and, consequently, its duration.

In particular, according to the method a curve is preferably defined to express each one of said selected parameters as a function of the surface area of the supporting surface 6a or 7a.

Said predefined curve can be stored in the logic control unit 9 of the stereolithography machine 1, in such a way as to simplify said calculation.

Preferably, the values of the selected parameters are calculated as a function of the ratio between said surface area and its perimeter, which represents the shape of the layer.

In this way, advantageously, it is possible to take into account the fact that the outflow time of the liquid substance 3 depends not only on the surface area of the supporting surface 6a or 7a but also on its perimeter.

More precisely, among all the possible shapes having the same surface area, the circular shape of the supporting surface is the one with the shortest perimeter and thus the one that offers the liquid substance 3 fewer chances of escape, thus extending the outflow time.

Vice versa, a supporting surface featuring a longer perimeter compared to a circular layer having the same surface area gives the liquid substance 3 more chances of escape and thus the outflow time is shorter than in the previous case.

Consequently, the number of intermediate stops 14, 14a, 14b and/or the corresponding time intervals 15, 15a, 15b can be reduced as the shape of the supporting surface 6a, 7a becomes increasingly different from the circular shape, while the situation is exactly the opposite for the lengths of the approaching moves 12, 12a, 12b, 12c.

A possible formula for the above mentioned shape ratio is the following:

$$R = 4\pi A / P^2$$

where R stands for the shape ratio, A for the surface area of the supporting surface and P for its perimeter.

It is evident that the above mentioned shape ratio assumes a maximum value equal to 1 when the supporting surface has a circular shape and progressively decreases towards 0 (zero) as the supporting surface becomes more flattened.

According to a variant embodiment of the method of the invention, the calculation of the above mentioned selected parameters can be made taking in consideration a further shape parameter having a simplified formula compared to the previous one.

Preferably, the calculation of the above mentioned shape parameter requires that the surface area of the supporting surface 6a or 7a be divided into a plurality of cells having predefined dimensions, each one of which is assigned a weight that is proportional to the number of cells adjacent to it.

The weights of the cells are summed together in order to obtain the above to mentioned shape parameter, which is used to calculate the values of the selected parameters in replacement of said shape ratio.

Obviously, the calculation of the selected parameters can be carried out even combining the above mentioned methods, that is, using the surface area, the shape ratio and/or the shape parameter in combination with each other.

It is evident that this simplified method is particularly suited to be used when the supporting surface has a complex geometrical shape.

Preferably, if the supporting surface is constituted by several areas separated from each other, in the calculation of the selected parameters only the surface area, the shape ratios and/or the shape parameters corresponding to the portions whose surface area exceeds a predefined value or only to the portion with the largest surface area are taken in consideration.

Advantageously, this makes it possible to minimise the approach time and/or the extent of the respective movement, without increasing the risk of breakage of the object being formed.

In fact, it should be considered that each one of said portions is subjected to a thrust force that is substantially independent of the one acting on the other portions, and that, therefore, it will be possible to define the selected parameters only according to the portions for which the thrust force is greater, meaning the portions, or portion, with larger surface area.

It is also evident that in further variants of the method of the invention the lengths of the approaching and receding moves 12, 12a, 12b, 12c and 12d, the number of the intermediate stops 14, 14a, 14b and 14c and/or the corresponding time intervals 15, 15a, 15b and 15c can be determined once and for all before starting the construction of the model and be maintained unchanged for all of the layers.

In any case, preferably but not necessarily the lengths of the approaching moves 12a, 12b, 12c following the first intermediate stop 14 are defined so as to be the same, for the sake of calculation simplicity.

Furthermore, the value of the above mentioned parameters can be defined according to other parameters in addition to those described above, for example the viscosity and density of the liquid substance 3, the movement speed of the actuator means 8, the maximum depth of the liquid substance 3 present in the container 2, the mechanical resistance of the bottom 2a or of the respective supporting wall and the mechanical resistance of the solidified to layers 6'.

By way of example, for a stereolithography machine 1 of the known type, an intermediate number of stops included between one and twenty, a length of each approaching move 12a, 12b, 12c included between 5 and 200 micron and a duration of the time intervals 15, 15a, 15b included between 0.01 seconds and 1 second can be suited to most applications.

According to an example of application of the method described above, a numerical representation of each layer of the object to be produced is processed and supplied to the logic control unit 9.

According to the data supplied, the logic unit 9 determines the number of intermediate stops 14, 14a, 14b, 14c, their duration 15, 15a, 15b, 15c, as well as the extent of the approaching moves 13, 13a, 13b, 13c, 13d in order to arrange the supporting surface 7a of the modeling plate 7 in the operating position 17, consequently operating the actuator means 8.

Successively, the logic unit 9 activates the emitting means 5 in such a way as to form the first solidified layer 6'.

The modeling plate 7 is then moved away from the bottom 2a, so that the solidified layer 6' is separated from it.

Before a successive layer is solidified, a second positioning movement 11 positions the previous solidified layer 6' with the surface 6a in the operating position 17.

The above shows that the method for producing a three-dimensional object and the stereolithography machine described above achieve all the set objects.

In particular, the intermittent positioning movement makes it possible to reduce the stress on the solidified layer and on the bottom of the container when these elements are moved near each other.

Therefore, it is possible to reduce the duration of the approaching movement with respect to the duration necessary when a machine of the known type is used, the object having the same geometrical shape.

Furthermore, the method of the invention is based on an intermittent movement that is easy to apply to stereolithography machines of the known type through simple modifications of the machine setting.

Upon implementation, the method and the machine that are the subjects of the invention may be subjected to further changes that, even though not described herein and not illustrated in the drawings, must all be considered protected by the present patent, provided that they fall within the scope of the following claims.

Where technical features mentioned in any claim are followed by reference signs, those reference signs have been included for the sole purpose of increasing the intelligibility of the claims and accordingly such reference signs do not have any limiting effect on the protection of each element identified by way of example by such reference signs.

The invention claimed is:

1. A method for producing a three-dimensional object in layers using a stereolithography machine, said stereolithography machine comprising:
    a container for containing a liquid substance suited to be solidified through exposure to predefined radiation;
    a device for emitting said predefined radiation, suited to selectively irradiate a layer of said liquid substance having a predefined thickness and arranged adjacent to a bottom of said container in order to solidify said liquid substance;
    a supporting surface for a solidified layer, facing the bottom of said container; and
    an actuator suited to move said supporting surface with respect to said bottom at least according to a direction perpendicular to said bottom;
    said method comprising the following steps:
    moving said supporting surface near said bottom through a mutual positioning movement, in such a way as to arrange said supporting surface in contact with said layer of liquid substance in a predefined operating position; and
    with said supporting surface in said operating position, selectively irradiating said layer in such a way as to solidify said layer,
    wherein said positioning movement comprises a plurality of approaching moves having corresponding predefined lengths, spaced by corresponding intermediate stops for corresponding predefined time intervals, said intermediate stops being carried out when said supporting surface is at least partially immersed in said liquid substance.

2. The method according to claim 1, wherein a value of at least one parameter selected among the lengths of said approaching moves, a number of said intermediate stops and the corresponding time intervals is determined before starting said positioning movement.

3. The method according to claim 2, wherein the values of said selected parameters are calculated as a function of a surface area of said supporting surface.

4. The method according to claim 3, wherein the values of said selected parameters are calculated as a function of a ratio between said surface area and a perimeter of said supporting surface.

5. The method according to claim 1, wherein calculation of said selected parameters comprises the following steps:
    dividing said surface area of said supporting surface into a plurality of cells;
    assigning each cell a weight proportional to a number of cells adjacent to said cell;
    summing up said weights in order to obtain a shape parameter; and
    calculating the values of said selected parameters according to said shape parameter.

6. The method according to claim 1, wherein the approaching moves following a first one of said intermediate stops have respective lengths that are equal to each other.

7. The method according to claim 1, wherein said supporting surface belongs to said solidified layer of said three-dimensional object.

8. The method according to claim 1, wherein said supporting surface belongs to a modelling plate belonging to said actuator.

9. The method according to claim 1, wherein a last one of said approaching moves said supporting surface beyond said operating position, and wherein said positioning movement ends with a receding move of said supporting surface away from said bottom.

10. The method according to claim 1, wherein a number of said intermediate stops is between 1 and 20, wherein each of said predefined lengths of each of said intermediate approaching moves is between 5 and 200 micron, and wherein a duration of said time intervals is between 0.01 seconds and 1 second.

* * * * *